United States Patent [19]
Samuelson

[11] Patent Number: 5,966,208
[45] Date of Patent: Oct. 12, 1999

[54] OPTICAL TESTING APPARATUS FOR AN OPTICAL SYSTEM

[75] Inventor: David W. Samuelson, London, United Kingdom

[73] Assignee: DSAM Limited, London, United Kingdom

[21] Appl. No.: 08/879,450

[22] Filed: Jun. 20, 1997

[30] Foreign Application Priority Data

Jun. 21, 1996 [GB] United Kingdom .................. 9613092

[51] Int. Cl.⁶ ...................................................... G01B 9/00
[52] U.S. Cl. ............................................................ 356/124
[58] Field of Search ................................ 356/124, 124.5, 356/125, 126, 127, 243, 138, 153

[56] References Cited

U.S. PATENT DOCUMENTS

3,785,733  1/1974  Bender ..................................... 356/124
3,912,396  10/1975  Hartmann ............................... 356/124.5
4,682,894  7/1987  Schmidt et al. ........................ 356/243.4
5,530,548  6/1996  Campbell et al. ..................... 356/243.1
5,621,520  4/1997  Hoffman .............................. 356/124.5

*Primary Examiner*—Hoa Q. Pham
*Attorney, Agent, or Firm*—Price, Heneveld, Cooper, DeWitt & Litton

[57] ABSTRACT

A testing apparatus for an optical system comprises a plurality of markers disposed along an axis to be aligned with the optical axis of the optical system, the markers being axially spaced from one another and angularly displaced relative to one another so as to effectively define a helix about the axis. When viewed from one end of the apparatus the markers provide focusing and depth of field information, and some aberrational information about the optical system. Preferably the markers are spaced so as to correspond to the depth of field of the lens aperture stop values of a camera, allowing the aperture settings of the camera to be tested.

7 Claims, 5 Drawing Sheets

FIG. 10

OPTICAL TESTING APPARATUS FOR AN OPTICAL SYSTEM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to an optical testing apparatus for an optical system, in particular a depth of field testing apparatus including a plurality of axially spaced markers for testing the depth of field of photographic or video lens systems.

2. Description of the Related Art

A known apparatus for photographically testing a camera lens comprises a flat (two-dimensional) test or resolution or focusing chart which is placed at the plane of focus and photographed, viewed on a video screen, or otherwise used in conjunction with any optical viewing system. Such charts commonly comprise sharply printed characters, lines or patterns in white printed on black or vice versa. One such pattern comprises groups of lines and spaces of known width and spacing representing discrete spatial frequencies. These are often known as "USAF", "NBS" or "Cobb resolution charts". Various aspects of optical performance can be tested using this apparatus. Known tests are described in, for example, Society of Motion Picture & Television Engines (SMPTE) Recommended Practice, March 1979, Volume 88 RP82-1978, pp 172–174, and Method of Determining the Resolving Power of Lenses for Camera (British Standard) BS 1613:1961.

It is also desirable, however, to test the "depth of field" of an optical system such as a camera and lens combination, that is, to test the extent to which nearer and further objects are in and out of acceptable focus. This is because lenses do not only image flat surfaces but they also include objects nearer and further than the plane of focus, such objects being less "sharply" defined. Various parameters influence the depth of field, for example the mathematical co-relationship of the lens focal length, the lens aperture, the focus distance and the aberrational "circle of confusion" at the image plane. The circle of confusion may be defined as the level of blurring of an infinitely small spot of light imaged by the optical system which gives rise to a blur circle at the image plane. For professional 35 mm cinematography a circle of confusion of 1/1000 of an inch (0.0254 mm) is common. A further parameter influencing the depth of field is set by the optical aberrations of the lens or lenses in the optical system. A further discussion of these parameters can be found in "Optical System Design" by Rudolph Kingslake, Academic Press 1983.

In the past, depth of field has been tested by means of what is known as a "harp" chart. This test method uses a rectangular frame with parallel strings or wires drawn from the top of the frame to the bottom. The frame, with the strings set vertically (or horizontally), is then placed obliquely through the plane of focus and in this manner the fall off in focus on either side of the plane of focus can be seen. Tags can be attached to the strings to mark different distances from the optical system being tested.

A problem associated with such an arrangement is that it is imprecise and conveys little quantitative information to the tester.

Further known tests are described for example in "Lens Evaluation with Basic Laboratory Equipment" by Bruce H Walker, Optical Spectra July/August 1970.

SUMMARY OF THE INVENTION

According to the present invention there is provided an optical testing apparatus for an optical system the apparatus comprising a plurality of markers provided at or extending from an axis arranged to be aligned with the optical axis of the optical system, the markers being spaced from one another along the axis. The apparatus preferably comprises a depth of field testing apparatus; because the markers are provided along the optical axis, quantitative focus and depth of field information can be accurately derived.

The markers are preferably angularly displaced relative to one another about the axis. As a result of this configuration the markers can be easily distinguished, allowing simple and accurate objective and subjective testing. The angular displacement of each successive marker may be incremented in the axial direction, such that markers appear sequentially in a clockwise or anti-clockwise direction when viewed from the camera position.

Each marker may be triangular in shape with an apex at or near the axis, so effectively forming with the other markers a series of sectors of a circle, and the markers may progressively increase in dimension in the axial direction such that, when viewed from a predetermined point along the axis, the plurality of markers appear as a circle. Each substantially triangular marker may have a base slightly longer than required to form a sector of the perceived circle such that successive markers are viewed as overlapping and no gaps are visible.

The markers may be axially spaced to correspond with the depth of field calibration convention of a selected optical system, for example, the markers may be spaced in accordance with the lens aperture stop convention in photography. As a result, if the camera stop value increases or decreases by one or two increments, markers which are correspondingly distant either side of the best focus plane come into an acceptable level of focus. Testing is thus both accurate and simple.

Each marker may carry a resolution chart. The markers may have their particular focal distance placement marked upon them or may be numbered consecutively in an axial direction or a marker may be selected as the focal centre and the markers numbered consecutively in each direction, extending towards and away from the selected marker. To make testing simpler, different systematic marker numbers corresponding to different depths of field may be adopted.

The apparatus may comprise an elongated mount aligned with the axis on which the markers are mounted.

A marker may be selected as the focal centre and comprise an extended surface on which a marker representation is mounted or printed and a cut-out portion such that markers behind the extended surface are visible when viewed along the optical axis. Alternatively or in addition a plane of focus view board may be provided extending laterally from the axis. The board may carry a resolution chart allowing assessment and comparison of the centre and edge of field focus and resolution and comparison of the image widths of different lenses (for example fixed focus and zoom). The board may carry test data such as lens type, serial number and the aperture used.

Preferably the field of view board extends perpendicular to and to a first side of the axis. Preferably those markers in front of the board also extend to the first side of the axis and those markers behind the board extend to a second side of the axis so as not to be obscured by the board. As a result the board itself may be of simple shape, not requiring any apertures and so forth. In addition, complex lighting arrangements are not required.

Preferably two of the markers, for example the front most and rear-most are provided with calibration marks at edges which, on viewing the markers along the optical axis, coincide. Preferably each mark is located on the respective marker at a predetermined height, such that, when the marks coincide, the entrance pupil is located.

Preferably a mounting post is provided along the optical axis for mounting the markers, the mounting post being hollow. Accordingly the equipment to be tested can be aligned with the optical axis by sighting along the inside of the post. A light or bright surface can be provided behind the post to aid sighting.

In a further embodiment, in addition to the depth of field being determinable with the apparatus, it is also capable of establishing the location of the entrance pupil of the optical system. This additional function is achieved by the provision of fiducial marks on the sequence of markers which align in the field of view of the optical system being tested when the entrance pupil of the said optical system is positioned at a critical axial position defined by the fiducial markers.

One know phenomenon that occurs with changes in aperture is "focus shift"; this usually manifests itself at full aperture and can be so severe that some lenses have an alternative focus datum mark to be used at or near full aperture. The system, by virtue of the features discussed herein can also highlight: and identify the presence of any focus shift with a change in aperture.

Finally, not only can the depth of field and the entrance pupil position for any optical system be determined with this apparatus, but test results also yield information about the aberrations of the optical system. In particular it is possible to locate the critical focus plane in the presence of chromatic aberration. The chromatic aberration which is normally of interest in practical lens testing situations is the secondary spectrum residual error that remains when a typical lens system has been corrected for primary chromatic aberration.

In practice the depth of field will rarely be symmetrical as it is calculated from the entrance pupil of the lens whilst cinematographers measure focus distances from the film plane which is usually slightly further away. Accordingly, preferably, the or each marker is slidably mounted along the axis and is arranged to be slid towards or away from the central marker. As a result the markers can be aligned with perceived rather than calculated depth of field. For example the user can carry out a first photograph test using the calculated positions, observe that there is more depth of field in one direction than the other and interpolate from this where the charts should be to achieve symmetry. The individual markers can then be slid towards or away from the central marker as appropriate and, by process of trial and error involving further tests the ideal distances between the central marker and each other marker can be established. These distances can be used as a reference during filming.

A marker may be selected as the focal centre and further markers may be located axially either side of the selected marker for testing symmetry of focus. This allows the user to make an objective judgement on symmetry of focus.

BRIEF DESCRIPTION OF THE SEVERAL VIEWS OF THE DRAWINGS

Embodiments of the invention will now be described, by way of example, with reference to the drawings of which.

DETAILED DESCRIPTION OF THE PREFERRED EMBODIMENT

Figure 1:
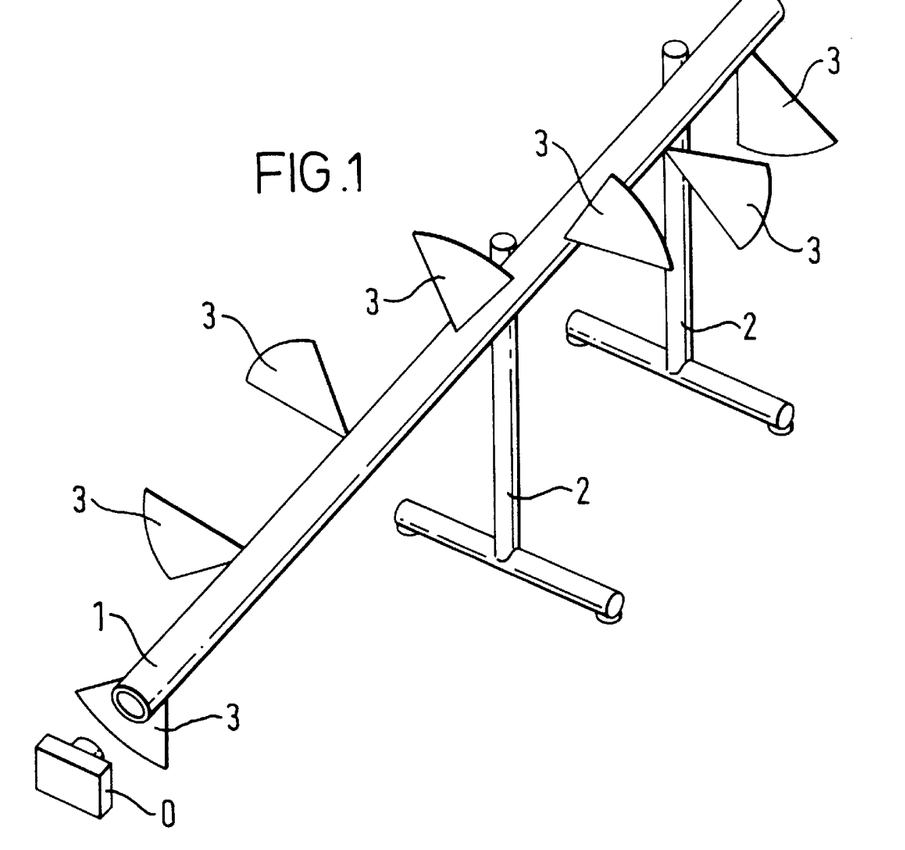
FIG. 1 shows a depth of field testing apparatus according to the present invention.

Referring to FIG. 1 the apparatus comprises an axial mount, for example an elongate tube 1 which may of plastic, metal or any other suitable material supported by legs 2 which may also be of any suitable material. The legs 2 shown are in the form of inverted T members but may have alternative configurations.

Provided on the mount 1 are a plurality of markers 3. The markers 3 are spaced apart from one another in the axial direction. The markers 3 are also preferably off-set angularly relative to one another such that they effectively define a helix about the axial mount 1.

As can be seen the legs 2 are off-set so as to contact the mount 1 at one side. As discussed in more detail below, this allows the rear, downwardly pointing marker 3 to be seen by an optical system O aligned with the axis defined by the mount 1 at the other end of the apparatus, without the leg 2 obscuring the marker 3. In the present system the mount 1 is cantilevered from the legs 2 which grip the mount 1 in any conventional manner, for example using a "flag stand" side-grip well known in the cinema film production industry. Alternative arrangements allowing a clear view of the rear marker will be evident to the skilled person/practitioner.

Figure 3:
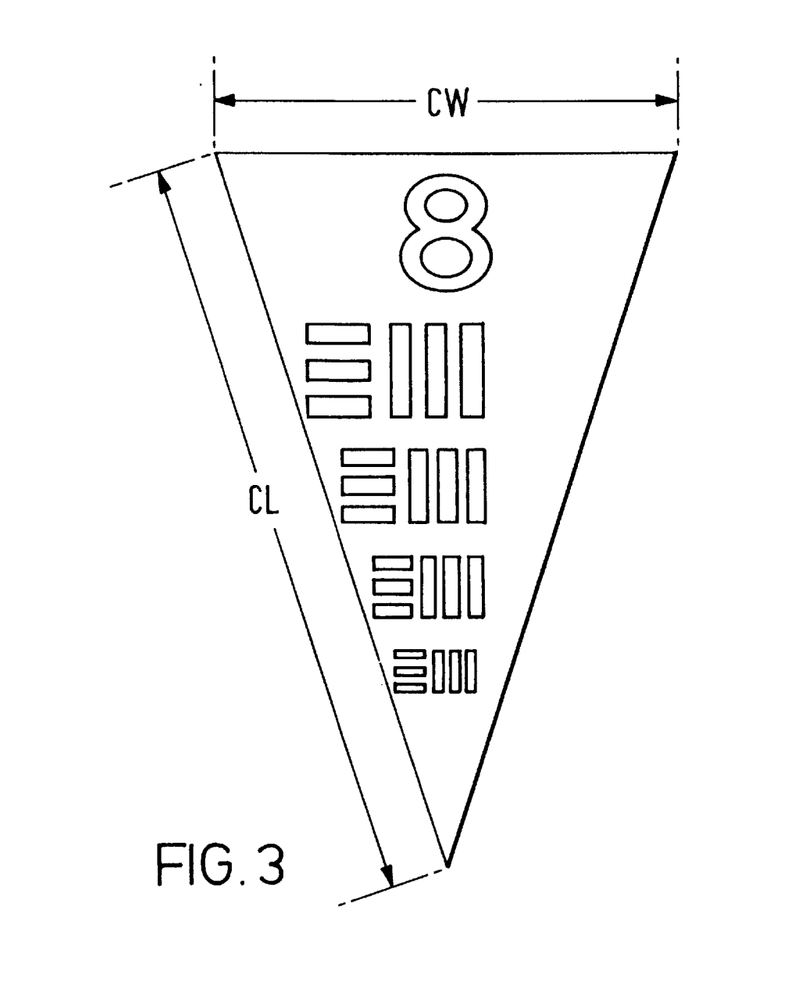
FIG. 3 shows a depth of field marker for the apparatus in a preferred form.

The markers 3 preferably carry some form of marking such as numerals and/or vertical and horizontal bars, as shown in stylised form in FIG. 3, such that the degree of focusing can be determined from a photograph taken of the markers 3. Cobb chart type markings or similar as listed above, or custom designed chart markings may, for example, be used. Alternatively the physical edges of the markers may be used to determine the level of focus.

When an optical system 0 such as a camera is arranged with its optical axis aligned with the axis of the apparatus, (defined by the mount 1) the focus and the depth of field of the optical system can be determined by viewing through the optical system, or from a photograph, or by any other visual means provided by the optical apparatus, from the quality of focus of the sequential markers 3.

In the preferred embodiment the markers 3 each include test markings such as those shown in FIG. 3 and are numbered either sequentially from one end to the other or outwardly from the marker 3 that is selected as the datum focal marker (usually the central marker designated "8" for a sequentially numbered fifteen marker system as shown in FIG. 3 or "0" where the markers are numbered to ±7 on respective sides). The markers 3 may be formed of card or metal or any other suitable planar material and are preferably in the form of isosceles triangles or sectors of a circle having their apex at or adjacent to the central axis defined by the mount 1.

Figure 2:
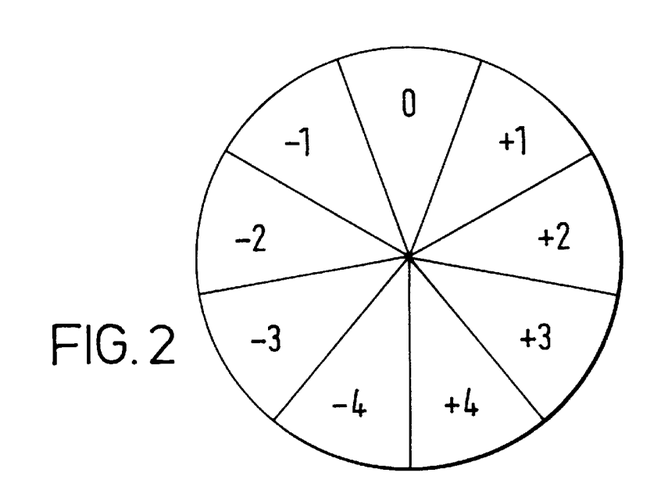
FIG. 2 shows the apparatus of FIG. 1 viewed along its axis.

Preferably the markers 3 increase in dimension from the end nearest the optical system. As a result, when the optical system O is arranged with its optical axis aligned with the mount 1 at one end of the apparatus the view shown in FIG. 2 is encountered (for a system of 9 markers numbered −4 through 0 to +4). The angle of the markers 3, the angular displacement of the markers and the respective dimension of the markers 3 are all selected such that the overall effect of the end view is that of a regular polygon or a circle. For example if there are 15 markers over all then each marker 3 can subtend an angle of 24° and the radial centre lines of adjacent markers can be spaced by 24°, such that 15 test charts are provided along the mount 1. Because the legs 2 are off-set as discussed above, all of the markers are visible. The angles are selected so that axially adjacent markers 3 appear to touch when viewed by the optical system O, to form a complete circle or a regular polygon. The effect can be enhanced by increasing the angle slightly so that each marker extends slightly behind the marker in front, the overlap ensuring that no distracting gaps are present.

The marker 3 at the plane of focus is generally aligned upward vertically such that the markers 3 that are closer and further away from the optical system appear either side thereof.

The markers 3 are set out at predetermined spacings along the axis which are determined corresponding to the limits of the depth of field set by conventional camera aperture stop values. Firstly a marker 3 (generally the central one) is selected as defining the plane of focus—the "focal marker". The markers 3 either side of the focal marker are spaced therefrom by a distance such that if the lens aperture setting is adjusted by one whole stop the desired degree of acceptable focus would be obtained at each of those markers. Additional markers are spaced further out accordingly. Of course, where alternative configurations to the "lens aperture stop" configuration are used, then appropriate spacings can be selected.

Once the spacing of the markers 3 has been determined the sizes of each of the markers are scaled so that when viewed from the position of the optical system O all markers appear to be exactly the same size. Because each marker 3 subtends an angle such that adjacent markers appear to touch, the front and rear markers appear to touch. As a result it can be easily determined whether the front and rear markers are of the same apparent size—if not, this indicates that although the optical system may be located at its intended distance, i.e. the distance from the focal plane, this distance does not coincide with the distance from the entrance pupil of the lens. Accordingly the differences between the two distances is clearly indicated and if required, the system could easily be set to the entrance pupil distance by adjusting a system until the two markers appear aligned. Thus exact positioning of the optical system can be easily achieved.

In the scheme shown in FIG. 3 the individual markers 3 are numbered sequentially 1 to 15, the datum marker being number 8. In alternative schemes the focal marker can be designated 0 and those closer and further from the optical system can be designated −1, −2, −3 etc., +1, +2, +3 etc. or in any other suitable way.

In an alternative system each marker has its individual distance either from the focal plane or from the optical system, providing additional information. The distance can be marked prominently with the numbering of the marker being visible but less prominent or vice versa.

Table 1 shows a suitable set of marker or "chart" spacings, lengths and widths expressed in millimeters for a camera having a 50 mm lens covering a conventional "cine" film frame. The longitudinal position datum point of the lens/camera in this case is the entrance pupil. The arrangements are shown for both 15 and 19 charts with an image size of 20 mm diameter (slightly less than a conventional 35 mm cine frame), a circle of confusion of 0.0254 mm and an array angle—that is, the angle subtended at the aperture of the optical system by the top of a marker—of 4.83830802°. For the 15 chart arrangement the chart angle is 24° and for the 19 chart arrangement the chart angle is approximately 18.95°.

When using a conventional 35 mm cine frame it should be noted that the image size of 20 mm is just less than the width of the frame and a little more than the vertical extent of the frame as a result of which part of the top and bottom of the image would be cut off. To overcome this a "full aperture frame" can be used; the frame is 18.67 mm high so that only minimal cut off is encountered. The various types of frame available will be known to the skilled man and a suitable frame can be selected. Of course an alternative is to vary the image size by changing the camera position to ensure that it fits within the frame.

TABLE 1

| CHART # | APERTURE | HYPERFOCAL DISTANCE | CHART DISTANCE | CHART LENGTH | CHART WIDTH | ANGULAR POSITION | CHART SCALE % |
|---|---|---|---|---|---|---|---|
| 19 CHART MODE | | | | | | | |
| −9 | 16 | 6151.574803 | 2038 | 173 | 58 | −216 | 67.1 |
| −8 | 11 | 8947.745168 | 2274 | 192 | 64 | −192 | 74.4 |
| −7 | 8 | 12303.14961 | 2443 | 207 | 69 | −168 | 80.2 |
| −6 | 5.6 | 17575.92801 | 2598 | 220 | 73 | −144 | 85.3 |
| −5 | 4 | 24606.29921 | 2712 | 230 | 77 | −120 | 89.1 |
| −4 | 2.8 | 35151.85602 | 2805 | 237 | 79 | −96 | 91.9 |
| −3 | 2 | 49212.59843 | 2870 | 243 | 81 | −72 | 94.2 |
| −2 | 1.4 | 70303.71204 | 2921 | 247 | 82 | −48 | 95.7 |
| −1 | 1 | 98425.19685 | 2956 | 250 | 83 | −24 | 96.9 |
| 0 | 0 | 0 | 3048 | 258 | 86 | 0 | 100 |
| +1 | 1 | 98425.19685 | 3145 | 266 | 89 | 24 | 103.1 |
| +2 | 1.4 | 70303.71204 | 3186 | 270 | 90 | 48 | 104.7 |

TABLE 1-continued

| CHART # | APERTURE | HYPERFOCAL DISTANCE | CHART DISTANCE | CHART LENGTH | CHART WIDTH | ANGULAR POSITION | CHART SCALE % |
|---|---|---|---|---|---|---|---|
| +3 | 2 | 49212.59843 | 3249 | 275 | 92 | 72 | 106.6 |
| +4 | 2.8 | 35151.85602 | 3337 | 282 | 94 | 96 | 109.3 |
| +5 | 4 | 24606.29921 | 3479 | 294 | 98 | 120 | 114 |
| +6 | 5.6 | 17575.92801 | 3687 | 312 | 104 | 144 | 120.9 |
| +7 | 8 | 12303.14961 | 4052 | 343 | 114 | 168 | 132.9 |
| +8 | 11 | 8947.745168 | 4623 | 391 | 130 | 192 | 151.6 |
| +9 | 16 | 6151.574803 | 6041 | 511 | 171 | 216 | 198.1 |
| 15 CHART MODE | | | | | | | |
| −7 | | | 2443 | 207 | 88 | −168 | 80.2 |
| −6 | | | 2598 | 220 | 94 | −144 | 85.3 |
| −5 | | | 2712 | 230 | 98 | −120 | 89.1 |
| −4 | | | 2805 | 237 | 101 | −96 | 91.9 |
| −3 | | | 2870 | 243 | 103 | −72 | 94.2 |
| −2 | | | 2921 | 247 | 105 | −48 | 95.7 |
| −1 | | | 2956 | 250 | 106 | −24 | 96.9 |
| 0 | | | 3048 | 258 | 110 | 0 | 100 |
| +1 | | | 3145 | 266 | 113 | 24 | 103.1 |
| +2 | | | 3186 | 270 | 115 | 48 | 104.7 |
| +3 | | | 3249 | 275 | 117 | 72 | 106.6 |
| +4 | | | 3337 | 282 | 120 | 96 | 109.3 |
| +5 | | | 3479 | 294 | 125 | 120 | 114 |
| +6 | | | 3687 | 312 | 133 | 144 | 120.9 |
| +7 | | | 4052 | 343 | 146 | 168 | 132.9 |

TABLE 2

Ft & Ins CHART SPACINGS for 1/1000° C. of C

| | PLANE OF FOCUS | | | | | |
|---|---|---|---|---|---|---|
| CHART | 3'0" | 6'0" | 12'0" | 3'0" | 6'0" | 12'0" |
| | | | CHART DISTANCES | | | |
| NUMBER | Ft. & Ins. | | | Expressed in meters | | |
| −7 | 1'11" | 4"8" | 10'6" | 0.58 | 1.42 | 3.2 |
| −6 | 2'2" | 5'0" | 10'10.5" | 0.65 | 1.53 | 3.33 |
| −5 | 2'4" | 5'3" | 10'11" | 0.71 | 1.6 | 3.41 |
| −4 | 2'6" | 5'5.5" | 11'2.5" | 0.76 | 1.66 | 3.48 |
| −3 | 2'7.5" | 5'7" | 11'7" | 0.8 | 1.71 | 3.53 |
| −2 | 2'8.5" | 5'8.5" | 11'8.5" | 0.83 | 1.74 | 3.57 |
| −1 | 2'9.5" | 5'9.5" | 11'9.5" | 0.85 | 1.77 | 3.59 |
| 0 | 3'0" | 6'0" | 12'0" | 0.91 | 1.83 | 3.66 |
| +1 | 3'3" | 6'2.5" | 12'2.5" | 0.99 | 1.9 | 3.73 |
| +2 | 3'4" | 6'4" | 12'3.5" | 1.02 | 1.93 | 3.75 |
| +3 | 3'6" | 6'5.5" | 12'5.5" | 1.07 | 1.97 | 3.8 |
| +4 | 3'9" | 6'8" | 12'7.5" | 1.15 | 2.03 | 3.85 |
| +5 | 4'2.5" | 7'0" | 12'11" | 1.28 | 2.14 | 3.94 |
| +6 | 4'11.5" | 7'5.5" | 13'4" | 1.51 | 2.28 | 4.06 |
| +7 | 6'11.5" | 8'5" | 14'0" | 2.12 | 2.56 | 4.27 |

METRIC CHART SPACINGS for 0.00254 mm C of C

| | PLANE OF FOCUS (Meters) | | | | | |
|---|---|---|---|---|---|---|
| CHART | 1 | 2 | 4 | 1 | 2 | 4 |
| | | | CHART DISTANCES | | | |
| NUMBER | Meters | | | Expressed in Ft. & Ins. | | |
| −7 | 0.62 | 1.52 | 3.45 | 2'0" | 5'0" | 11'4" |
| −6 | 0.7 | 1.64 | 3.61 | 2'3.5" | 5'4.5" | 11'10" |
| −5 | 0.76 | 1.73 | 3.71 | 2'6" | 5'8" | 12'2" |
| −4 | 0.82 | 1.8 | 3.79 | 2'8" | 5'11" | 12'5" |
| −3 | 0.86 | 1.85 | 3.85 | 2'10" | 6'1" | 12'7.5" |
| −2 | 0.9 | 1.9 | 3.89 | 2'11.5" | 6'2.5" | 12'9" |
| −1 | 0.93 | 1.92 | 4.92 | 3'0.5" | 6'3.5" | 12'10.5" |
| 0 | 1 | 2 | 4 | 3'3.5" | 6'6.5" | 13'1.5" |
| +1 | 1.09 | 2.08 | 4.08 | 3'7" | 6'10" | 13'4.5" |
| +2 | 1.12 | 2.12 | 4.11 | 3'8" | 6'11.5" | 13'6" |
| +3 | 1.19 | 2.17 | 4.16 | 3'10.5" | 7'1.5" | 13'8" |

TABLE 2-continued

| +4 | 1.28 | 2.25 | 4.23 | 4'2.5" | 7'4.5" | 13'10.5" |
|---|---|---|---|---|---|---|
| +5 | 1.46 | 2.37 | 4.34 | 4'9.5" | 7'9.5" | 14'3" |
| +6 | 1.76 | 2.55 | 4.49 | 5'9" | 8'4.5" | 14'8.5" |
| +7 | 2.66 | 2.95 | 4.75 | 8'9" | 9'7" | 15'7" |

Table 2 is based on a nominal lens focal length of 50 mm used on a 35 mm cine camera filling an Academy format, with the critical focus chart set at 6' or 2 m, depending upon whether you are using the imperial dimensioned chart array or the metric array. In addition to these two chart arrays there are also two other pairs of chart arrays: one for a nominal lens focal length of 25 mm and the other pair for a nominal lens focal length of 100 mm. The former is set with its critical focus chart at 3' or 1 m from the lens entrance pupil and the latter are set at 12' or 4 m.

As will be seen the spacings in Table 1 are calculated for aperture values of 1, 1.4, 2 and 2.8 and so forth i.e. increasing by a factor of √2 and in table 2 for aperture 2, 2.8, 4, 5, 6 and so forth.

The skilled practitioner will appreciate how the various dimensions are calculated and suitable instructions can be found in, for example, David Samuelson's Hands On Manual for Cinematographers, Focal Press, Heineman.

In summary, however, the steps of the various calculations are given as follows in terms of a specific embodiment, the chart length (CL) and chart width (CW) being shown in FIG. 3:

Central chart length (CCL)=258 mm (Datum focal marker)
Focal length (f)=50 mm
Focus distance (L)=3048 mm (to focal marker measured from the lens)
Circle of confusion (d)=0.0254 mm $$\text{Chart Angle } (CA) = \frac{360°}{\text{Number of Charts}}$$

-continued $$\text{Array Angle } (AA) = \tan^{-1}\left(\frac{CCL}{L}\right)$$

Lens aperture (relative aperture) (S)=1, 1.4, 2, 2.8 etc $$\text{HyperfocalDistance } (H) = \frac{f^2}{d \cdot S}$$
(measured from the front focal point)

$$\text{Near Distance } (D_N) = \frac{H \cdot L}{L + H}$$

$$\text{Far Distance } (D_F) = \frac{H \cdot L}{H - L}$$

[Nearer Distance charts are numbered −1, −2, −3 etc. Further Distance charts are numbered +1, +2, +3 etc.]
Chart Length (CL)=D tan AA $$\text{Chart width } (CW) = 2 \cdot CL \cdot \tan\left(\frac{CA}{2}\right)$$

$$\text{Scaling of printing chart expressed as percentage} = \frac{CL}{CCL} \times 100$$

It will be appreciated that conventions and definitions may differ resulting in slight differences to the formulae. As the skilled man will recognise, as long as a consistent set of formulae are used the various relevant values can be calculated accordingly. A more detailed analysis of hyperfocal distance is given in Appendix A.

Further texts include a full discussion of the calculations and considerations that should be taken into account when designing a suitable system, for example Applied Photographic Optics by Sydney Ray, Cox's Photographic Optics and Hardy & Perrin Principles of Optics (McGraw Hill).

It will be appreciated that, in order to suit lenses of shorter or longer focal length, the focal markers may all be longer or the datum focal marker can be set at other distances from the camera, for example five feet or twenty feet (approx. 150 mm and 6000 mm respectively). In this case the spacing between the nearest and furthest markers 3 and the sizes of each chart would be changed accordingly, in order that they all appear the same size when photographed.

In use a camera or other optical system 0 is arranged with its optical axis aligned with the axis of the apparatus defined by the mount 1 and a suitable longitudinal position datum point, for example the entrance pupil, arranged at the desired distance from the central focal marker 3. With the depth of field of the camera set at a minimum, only the focal marker 3 may be in sharp focus and only the adjacent markers in, or near, acceptable focus. When the lens aperture setting is adjusted by one stop, the two next adjacent markers come into a more acceptable focus. For example if the central marker 3 is numbered 7 the two adjacent markers 6 and 8 are also focused to an acceptable level. If the setting is adjusted by a further stop then the markers 5 and 9 also come into a more acceptable level of focus. This system helps the user make an objective judgement on the near and far distance in acceptable focus as the focus setting or the stop are changed.

To form the apparatus in its simplest form as shown in FIG. 1, a horizontal tube or pole of approximately two inches (50 mm) and length a little greater than 13 feet 4 inches (4.11 m), is set coaxially with the camera and lens to be tested. As can be seen from Table 1 the focal plane of the camera must be set a little less than 6 feet 8 inches (2038 mm) from the near end of the tube and just over 20 feet (6041 mm) from the far end of the tube. The tube can be hollow meaning that the camera is easily aligned with the optical axis by sighting along it, especially in conjunction with a light or a bright surface behind the apparatus.

Conventional or custom lens resolution test charts are used, attached to suitable hard supports of, for example, plastic or cardboard, to form the markers, which are mounted on the tube. Table 1 shows the spacing between the markers together with the desired angular displacement of each marker. The markers are also sized as shown in Table 1 such that the view shown in FIG. 2 is obtained when the apparatus viewed from the near end by the camera.

Accordingly, in this scheme, the camera and lens combination and the depth of field can be simply and quickly tested to a high degree of accuracy.

Figure 4:
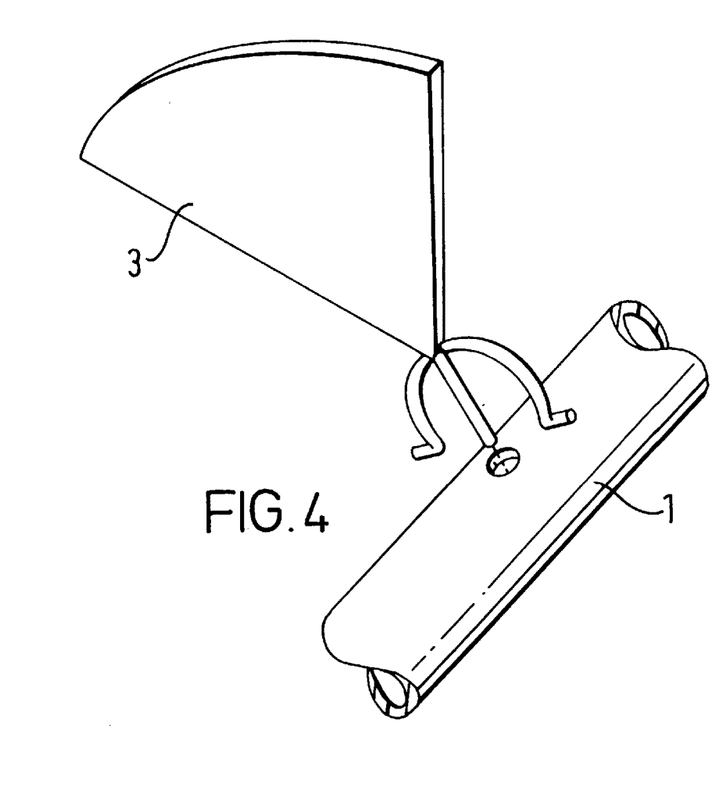
FIG. 4 shows one method of attaching the marker on the apparatus.

FIG. 4 shows in detail one possible manner of attaching the marker 3 to the mount 1. In this case, a hole has been drilled at the desired axial and angular displacement and a corresponding projection 5 is provided on the marker to be located in the hole. A spring clip 6 is also provided to grip around the mount 1 and hold the marker 3 in the desired plane, i.e. transverse to the optical axis defined by the mount 1. As mentioned above the marker 3 can comprise a suitably dimensioned triangular plate on which, as shown in FIG. 3, a focus chart is printed or supported and the protrusion 5 comprises an extended bolt or rivet holding the clip 6 to the marker 3. Alternatively, as discussed above and as shown in FIG. 5, the marker 3 can be inserted directly into a slot 7 cut into the mount 1 and having the same thickness as the marker 3. Because the slot 7 extends radially, it serves to locate the marker 3 at the desired axial and angular position and also retains it in the desired plane. Alternatively the end of each element may be bent over and the element held in position by a screw or rivet etc.

Figures 5, 6:
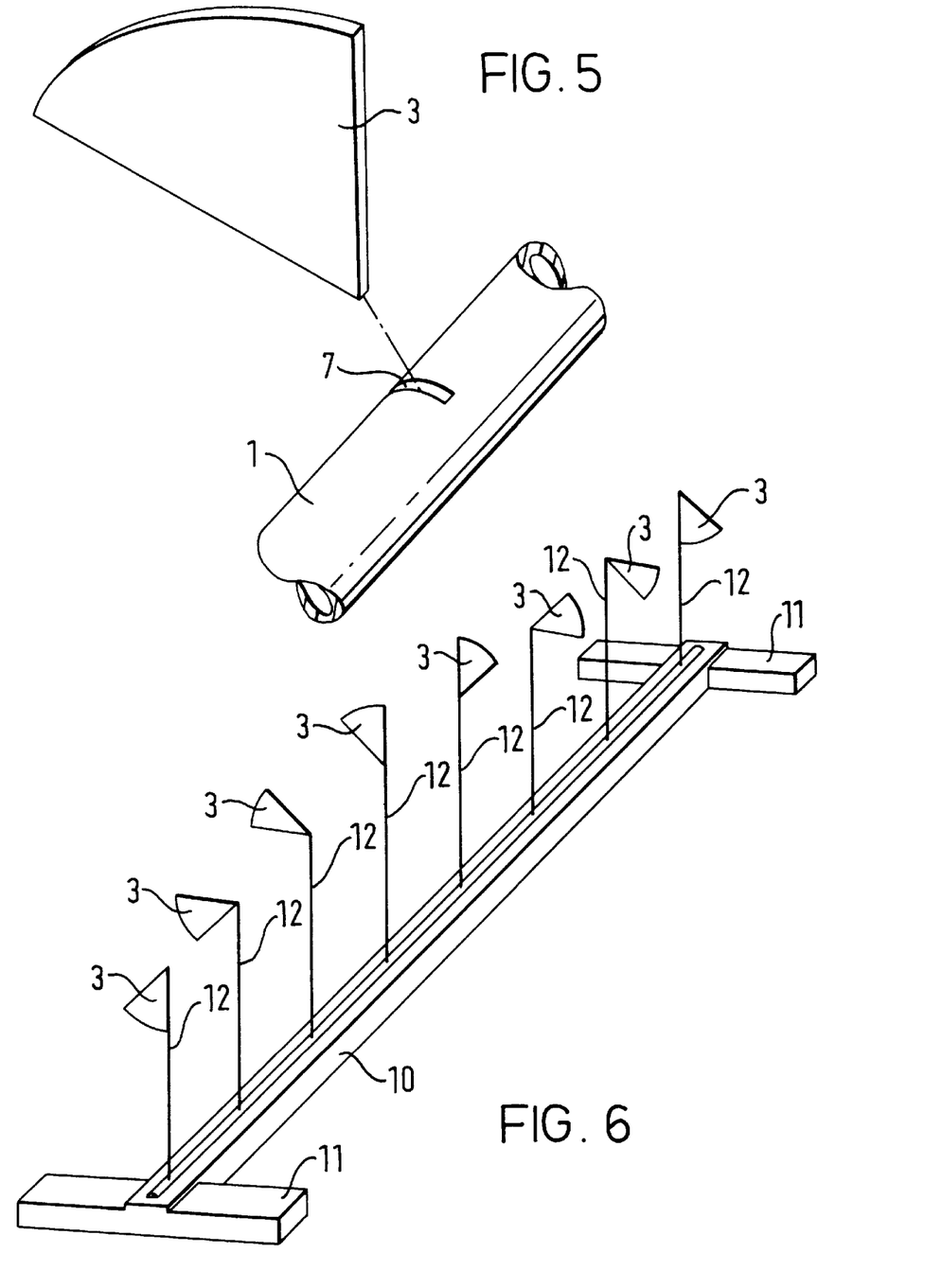
FIG. 5 shows an alternative method of attaching the marker on the apparatus.
FIG. 6 shows the apparatus according to an alternative embodiment of the invention.

Yet a further alternative system is shown in FIG. 6. In this case a horizontal track 10 is provided along a floor surface with stabilizers 11. A plurality of markers 3 are provided, each on a supporting leg 12. The supporting legs 12 are mounted on the track 10 at the predetermined spacing intervals. The markers 3 are mounted at the end of the respective legs 12, and the respective legs 12 are of equivalent heights such that their ends define an optical axis parallel to the track 10. The markers 3 are mounted at the appropriate angular displacements on the legs 12 such that: the helical arrangement is achieved.

Figures 7, 8:
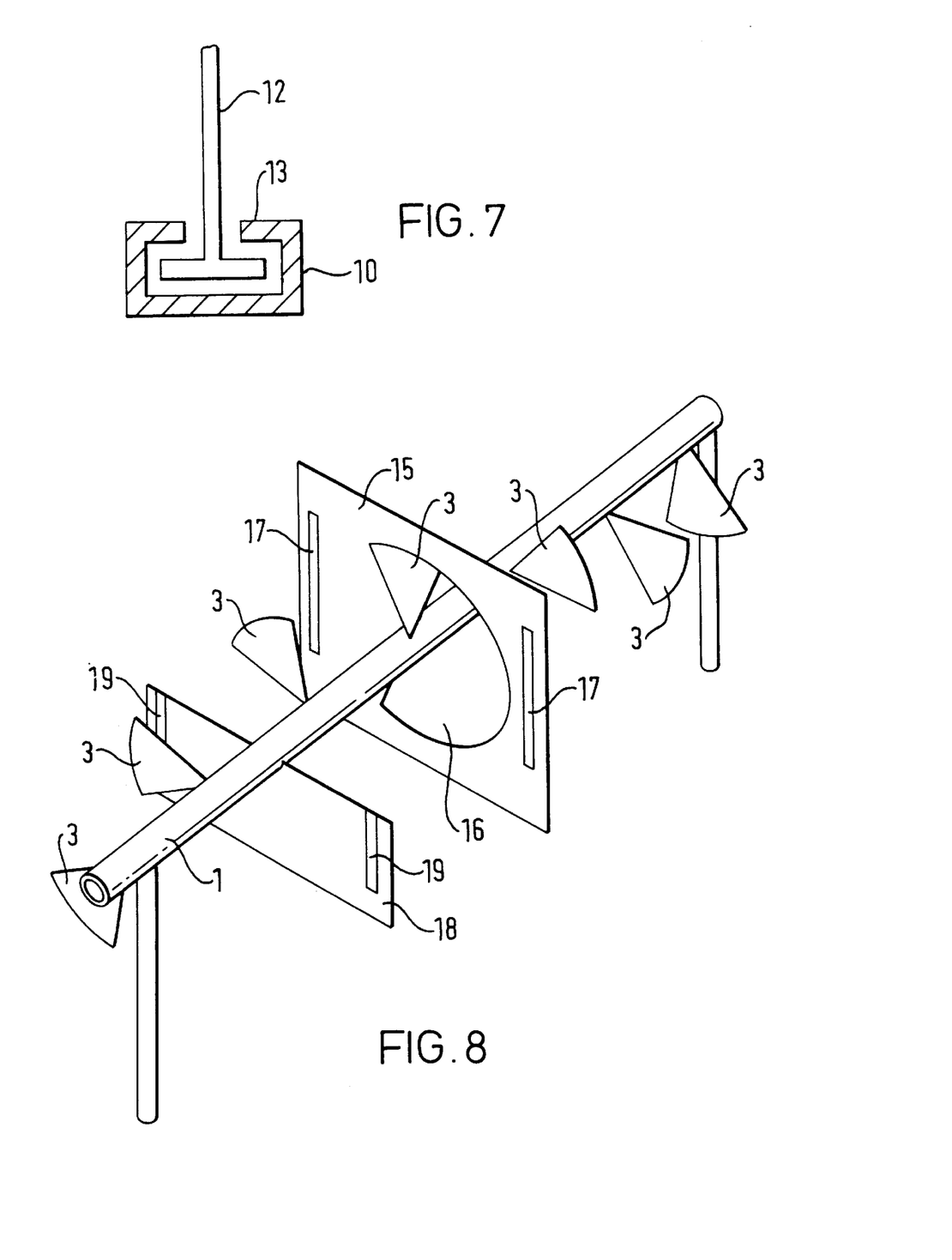
FIG. 7 shows a preferred method of attaching the marker in the alternative embodiment.
FIG. 8 shows yet a further embodiment of the invention.

As shown in FIG. 7, each supporting leg 12 may be of inverted T-shape and the track 10 may include a corresponding slot with over-hanging lips 13 within which the supports 12 are slidingly retained. As a result the spacing of the legs 12 can be varied as desired, for example for differing optical systems. In addition the markers 3 and legs 12 are interchangeable allowing different sizes to be inserted dependent on the system being tested.

In practice the depth of field may be asymmetrical as it is calculated from the entrance pupil while cinematographers measure focus distances from the film plane which is usually slightly further away. Where this asymmetry is observed in an initial test then the position of the markers can be adjusted by sliding them towards or away from the central marker along the track 10. Alternatively the locating pin in FIG. 4 could be removed such that the marker was held on by the spring clip and hence slidable. In this case the pins could either be removable or an alternative set of markers, carrying merely spring clips and no pins could be provided. Suitable removable labels such as stickers or erasable ink could be used to mark the modified distances. As the modified distances are quite small it would not significantly upset the scaling of the chart sizes.

Figure 10:
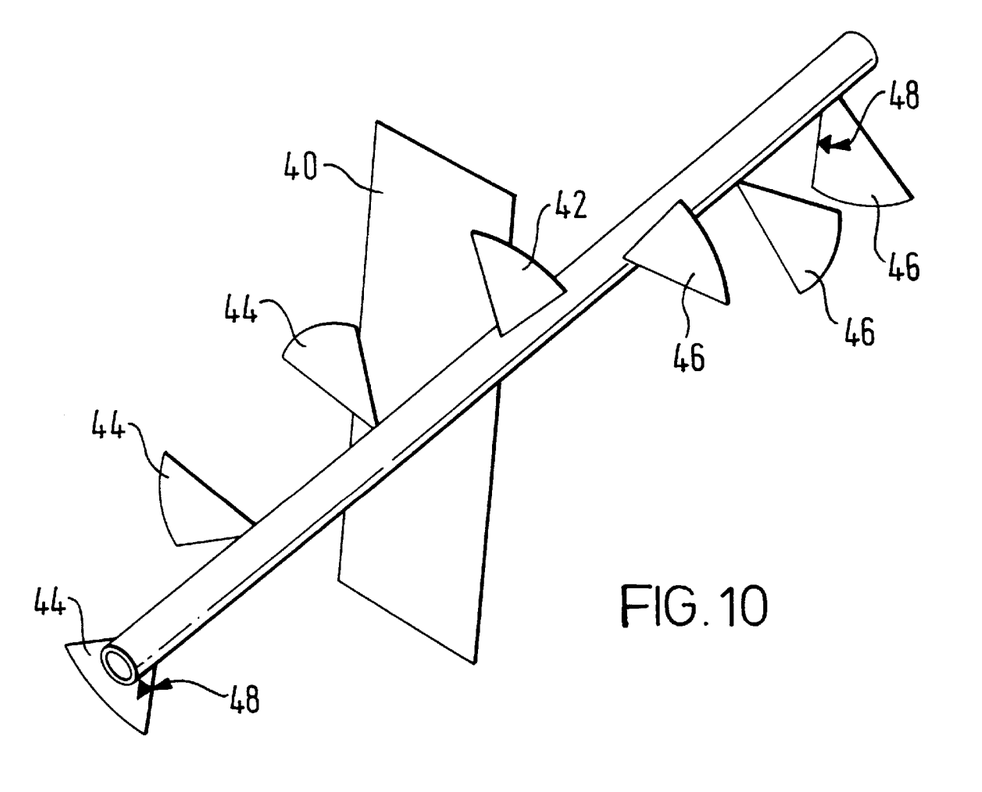
FIG. 10 shows a critical plane of focus field of view board.

A further alternative embodiment is shown in FIG. 8. In this case the central focal marker 3 is printed on a suitable large planar surface 15, for example of card. The card 15 is then mounted on the mount 1 in the datum focus plane with the marker 3 at the desired angular orientation, by any suitable means. Markers 3 closer to the optical system than the central marker will evidently be visible. In addition a semi-circular cut-out 16 is provided on the card 15 and positioned such that those markers 3 further from the camera than the central focal marker can be viewed through the cut-out 16. This system allows incorporation of additional fiducial marks, so allowing the entrance pupil of the lens of the optical system to be located. Alternatively or in addition a critical plane of focus field of view board 40 is provided across half of the field of view coincident with (or immediately behind) the central marker 42 as shown in FIG. 10. All of the markers 44 in front of the central marker 42 fall to the same side of the board 40, and all of the markers 46 behind the central member 42 fall to the other side so as not to be obscured. The board 40 carries identical markings to the central marker but offset further from the axis allowing comparison of centre-field and edge-field focus and resolution.

In the embodiment of FIG. 8 a pair of vertical lines 17 are inscribed on the card 15 on either side of the axis. A further card 18 is provided on the horizontal axis towards the near end of the mount 1. This may coincide with a marker 3 or it may be independent. The card 18 extends below the optical axis and includes a further pair of vertical lines 19 extending to its top edge. The spacing of the two lines 19 and the spacing of the two cards 15 and 18 are so arranged that the pairs of lines 17 and 19 coincide when viewed from a distance which exactly matches the focus distance of the central datum focal marker card 15. By moving the camera and lens combination backwards and forwards until the vertical lines coincide; it is thus possible to determine where the entrance pupil of the lens is situated, thus allowing the camera to be arranged relative to the testing apparatus with optimum precision. This adjustment comprises an alternative method of locating the optical system at the correct position relative to the test apparatus, which minimises the need for the above-mentioned approach of scaling selected markers to suit different camera positions. A simpler alternative is shown in FIG. 10 in which pointers 48 are marked on the front and rear-most markers. When the pointers coincide in the view finder of the camera the entrance pupil is located. Preferably the camera is mounted to slide on a base in the axial direction for ease of positioning.

A further advantage of the described test method is that it displays the effects of chromatic abberation; in particular, photographs taken viewing along the optical axis with an achromatically corrected optical system may show certain markers 3 tinged with a pink colour and yet others tinged with a green colour. Accordingly, yet further useful diagnostic information is provided by the test apparatus about the aberrational correction of the optical system being tested. The aforementioned pink and green coloured fringing is in particular associated with the determination of the critical focus setting in an achromatically corrected optical system.

Figure 9:
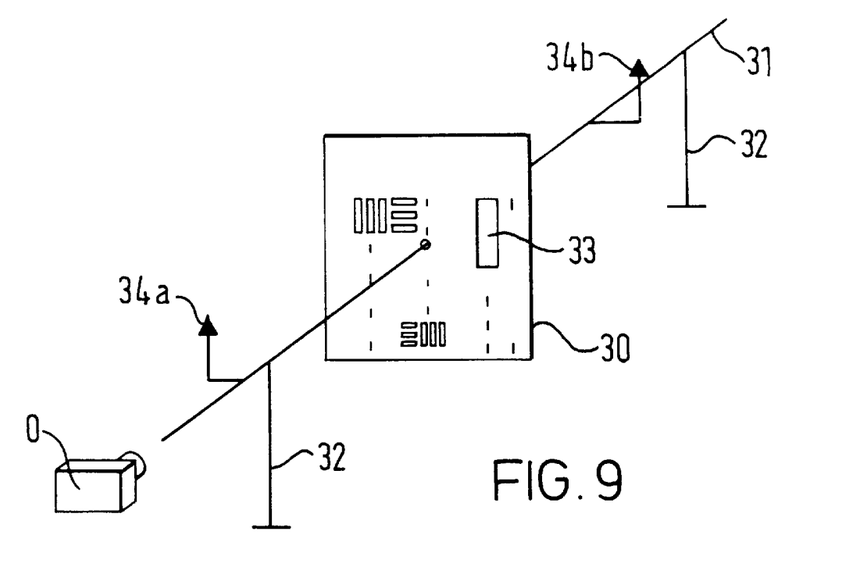
FIG. 9 shows an arrangement for testing symmetry of focus.

An alternative, simplified system for testing symmetry of focus comprises an improvement to known two-dimensional focusing test charts, as shown in FIG. 9. A focus chart 30 is mounted on an axial mount 31 supported on suitable legs 32. The chart 30 includes conventional focus testing indicia such as a Cobb chart. The chart 30 also includes an aperture 33. A pair of test indicia 34a, 34b are provided spaced an equal axial length along the mount 31 either side of the chart 30. The indicia 34a, 34b are suitable to gauge visually the level of focus quality visually. The aperture 33 and the test card 30 are positioned such that the indicia 34b behind the card is visible to the optical system O when it is aligned with the axial mount 31. By viewing the image received of the optical system O the user can gauge subjectively whether the indicia 34a, 34b are at equivalent levels of focus quality. Accordingly the arrangement allows an eye assessment of the symmetry of focus and subjective testing of the forward and backward depths of field. Of course this system may be incorporated in the apparatus illustrated in FIGS. 1 to 8.

It will be appreciated that the markers may be in other forms than those shown, as long as they meet the axial displacement criteria set out above. For example the markers may be suspended by any convenient appropriate means. Although the markers are shown as being of triangular shape, they could be simply rectangular or any other suitable shape as long as no marker obscured the view of any other marker. Although the spacings set out in the specific examples relate to the desired values for different lens aperture stop values, alternative calibration systems can of course be introduced, dependent on the relevant convention in any particular field of application. Any optical system in which it is desired to test the depth of field may be tested by the apparatus, for example a "still" camera, a "cine" camera, a "photogrammetric" camera, or a video camera.

APPENDIX A

1. Hyperfocal distance H

The hyperfocal distance H is the minimum distance on which a camera should be focused if objects at infinity are to be just in acceptable focus, as dictated by any chosen circle of confusions of diameter d.

The whole concept of hyperfocal distance is only appropriate for situations where the objects of interest are at some distance from the camera (not so far from infinity) and it is assumed that the film is very close to the focal plane of the lens.

An accurate formula for H is $$H_{LENS} = \frac{f^2}{d \cdot S} + f \qquad 1$$

but it is important to realise that this is measured from (the front nodal point of) the lens, so where a camera system is calibrated with focus distances measured from the film plane it is necessary to add the focal length to this and the nodal separation NN' (measured from the vertex of the front lens surface) (which may be positive or negative), so ending up with $$H_{FILM} = \frac{f^2}{d \cdot S} + 2f + NN' \qquad 2$$

Even this formula has a small approximation because it ignores the distance the lens has moved forwards to focus at the hyperfocal distance, but clearly that is a very small error which may be safely ignored.

In practice the 2f and the NN' are often ignored and H is given as $$H_{FF} = \frac{f^2}{d \cdot S} \qquad 2$$

and for general photography with short focal length lenses this is an acceptable working formula. Indeed, if it is remembered that this is measured from the front focal point of the lens it can be used as an accurate formula.

For the chosen circle of confusion criterion, the depth of focus then stretches from infinity down to half the hyperfocal distance of 3 above, that is, the closest focus point C is given by $$C_{LENS} = \frac{f^2}{2 \cdot d \cdot S} + f \qquad 1'$$

$$C_{FILM} = \frac{f^2}{2 \cdot d \cdot S} + 2f + NN^1 \qquad 2'$$

$$C_{FF} = \frac{f^2}{2 \cdot d \cdot S} \qquad 3'$$

2' designates the preferred cine versions of the formulae (because in cine practice distances are measured from the film plane).

Bearing in mind that NN' is difficult to determine and which is small compared with 2f, and certainly small compared with H we can use the following formulae:

$$H_{FILM} \doteq \frac{f^2}{d \cdot S} + 2f \qquad 2''$$

and $$C_{FILM} \doteq \frac{f^2}{2 \cdot d \cdot S} + 2f$$

2. Close focusing and focus splits

In this case it is necessary to take account of the distance that the lens has moved forward by to (a) allow for the change in the effective S at the film plane and (b) to take account of the greater distance from the film to the lens, which is part of the focusing distance as measured from the film plane.

I claim:

1. An optical testing apparatus for an optical system, the apparatus comprising a plurality of markers provided at or extending from an axis arranged to be aligned with an optical axis of the optical system, the markers being variably spaced from one another along the axis as a function of a focal length of the optical system in which the markers are further angularly displaced relative to one another about the axis.

2. A apparatus as claimed in claim 1 in which the angular displacement of each successive marker increments in the axial direction.

3. An apparatus as claimed in claim 1 in which each marker is triangular in shape with an apex at or near the axis effectively to form a sector of a circle.

4. An apparatus as claimed in claim 3 in which the markers progressively increase in dimension in the axial direction such that, when viewed from a predetermined point along the axis, the plurality of markers appear as a circle.

5. An optical testing apparatus for an optical system, the apparatus comprising a plurality of markers provided at or extending from an axis arranged to be aligned with an optical axis of the optical system, the markers being variably spaced from one another along the axis as a function of a focal length of the optical system in which the markers are axially spaced to correspond with the depth of field calibration convention of a selected optical system.

6. An apparatus as claimed in claim 5 in which the markers are spaced in accordance with the lens aperture stop convention in photography.

7. An optical testing apparatus for an optical system, the apparatus comprising a plurality of markers provided at or extending from an axis arranged to be aligned with an optical axis of the optical system, the markers being variably spaced from one another along the axis as a function of a focal length of the optical system wherein one of the plurality of markers is selected as the focal center and further markers are located equidistant axially either side of the selected marker for testing symmetry of focus.

* * * * *